United States Patent
Quantz

(10) Patent No.: US 8,616,179 B2
(45) Date of Patent: Dec. 31, 2013

(54) ROTARY THROTTLE VALVE CARBURETOR

(75) Inventor: Norman G. Quantz, Lorena, TX (US)

(73) Assignee: Lectron, Inc., Lorena, TX (US)

( * ) Notice: Subject to any disclaimer, the term of this patent is extended or adjusted under 35 U.S.C. 154(b) by 968 days.

(21) Appl. No.: 12/624,742

(22) Filed: Nov. 24, 2009

(65) Prior Publication Data
US 2011/0120414 A1  May 26, 2011

(51) Int. Cl.
*F02D 9/08* (2006.01)
*F01L 7/02* (2006.01)
*F16K 5/18* (2006.01)

(52) U.S. Cl.
USPC .......... 123/337; 123/190.12; 251/311

(58) Field of Classification Search
USPC ............ 123/190.12, 337; 261/44.6, 44.8; 251/309–312
See application file for complete search history.

(56) References Cited

U.S. PATENT DOCUMENTS

| | | | |
|---|---|---|---|
| 1,204,247 A | 11/1916 | Claudel | |
| 1,259,105 A | 3/1918 | Joret | |
| 1,339,095 A | 5/1920 | Bradshaw | |
| 1,737,496 A | 11/1929 | Feroldi | |
| 2,578,857 A * | 12/1951 | Sumpter et al. | 261/41.3 |
| 3,695,589 A * | 10/1972 | Lamore | 261/23.2 |
| 4,271,096 A | 6/1981 | Kobayashi | |
| 4,481,152 A | 11/1984 | Kobayashi et al. | |
| 5,300,259 A | 4/1994 | Tashiro | |
| 5,599,484 A | 2/1997 | Tobinai | |
| 5,662,086 A | 9/1997 | Piccinini | |
| 5,709,822 A | 1/1998 | Togashi | |
| 5,942,159 A | 8/1999 | Peterson | |
| 6,328,281 B1 | 12/2001 | Jung | |
| 6,394,424 B2 | 5/2002 | Pattullo et al. | |
| 6,394,425 B1 | 5/2002 | Nagata | |
| 6,431,527 B1 | 8/2002 | Suzuki et al. | |
| 6,585,235 B2 | 7/2003 | Pattullo | |
| 7,114,708 B2 | 10/2006 | Douyama et al. | |
| 7,146,941 B2 | 12/2006 | Ohtsuji | |
| 2006/0151893 A1 | 7/2006 | Horikawa et al. | |
| 2006/0162694 A1 | 7/2006 | Sakaguchi et al. | |
| 2006/0170120 A1 | 8/2006 | Takano et al. | |

* cited by examiner

*Primary Examiner* — Mahmoud Gimie
*Assistant Examiner* — David Hamaoui
(74) *Attorney, Agent, or Firm* — Bejin VanOphen & Bieneman PLC

(57) ABSTRACT

The invention is a rotary throttle valve carburetor that minimizes frictional drag on the airflow through the air intake passage. This is accomplished by providing bearing shafts at both ends of the rotary throttle valve body upon which are mounted ball bearings such that upon assembly of the rotary throttle valve body to the carburetor body housing, friction free rotation is established as the rotary throttle valve body is rotated by an accelerator cable from idle to full throttle position. The rotary valve carburetor also features a rotary throttle valve body assembly which by the use of end caps mounted to the rotary throttle valve body provides the ability to vary the venturi effect within the air intake passage by exchanging the rotary throttle valve body assembly and associated end caps with a different face angle so as to create a different venturi effect by the air passing through the air intake passage of the carburetor body housing.

17 Claims, 5 Drawing Sheets

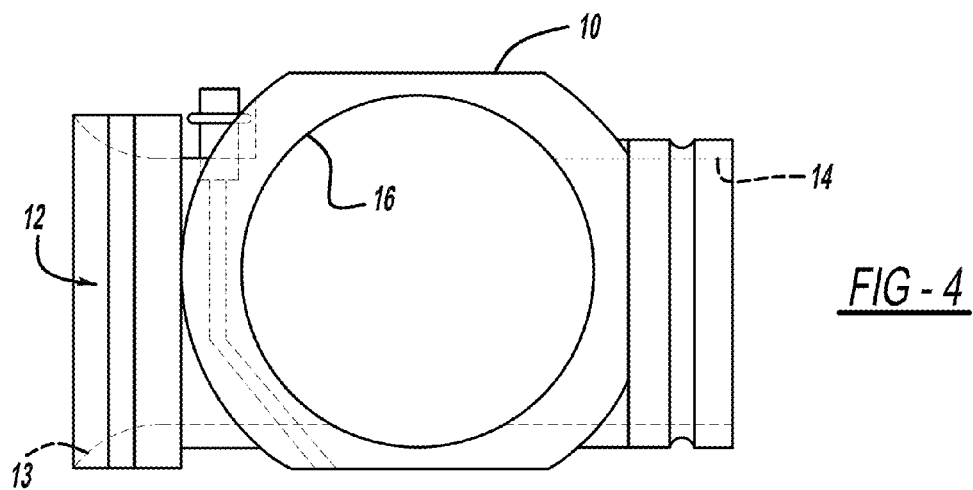
FIG - 4
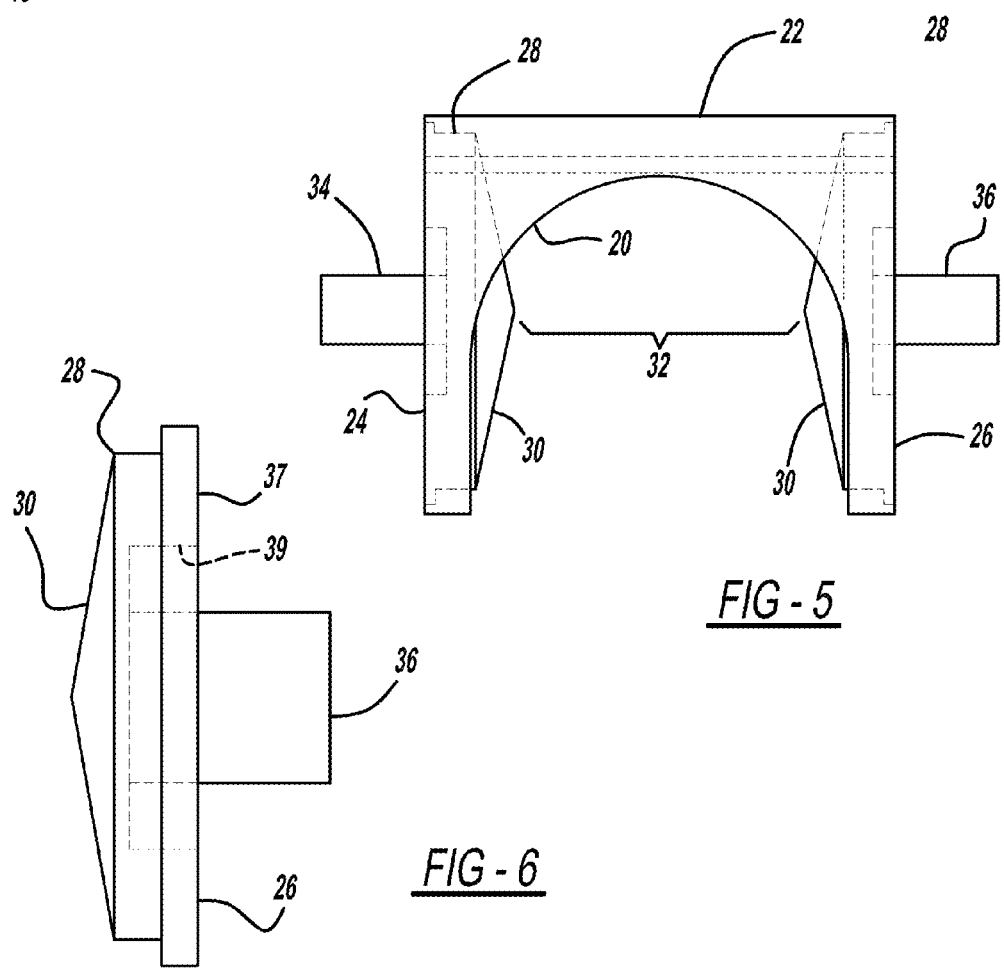
FIG - 5
FIG - 6

ROTARY THROTTLE VALVE CARBURETOR

CROSS-REFERENCE TO RELATED APPLICATIONS

None.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to a rotary-type throttle valve carburetor for a spark ignition internal combustion engine. More particularly, the present invention provides an improved rotary valve carburetor which is designed primarily for use with engines of racing vehicles which function to immediately provide the required fuel upon the opening of the control throttle by the use of a rotary-body type throttle valve that significantly reduces or eliminates resistance on the throttle valve as a result of flow through the venturi of a carburetor.

2. Description of Related Prior Art

Internal combustion engines typically employ a butterfly valve in a throttle body assembly of a carburetor to control air intake. The carburetor mixes fuel with the air flow through the air intake to form a combustible fuel/air mixture. In today's mass produced motor vehicles, federal regulations mandate a minimum amount of exhaust emission pollutants and hence places a high demand on air/fuel mixture preparation if compliance with these regulations is to be achieved. Since carburetors of the butterfly valve type have limitations in fine tuning, response time, inertia, as well as size and weight restrictions, carburetors have been replaced by fuel injection systems because these systems lend themselves to more precise metering and therefore control of the air/fuel mixture over the complete operational range of the internal combustion engine. The use of fuel injection systems in passenger car vehicles has also been a major contributor to meeting the strict fuel economy standards that must be complied with as well as concerns with good idle quality.

The demands for higher horsepower engines for racing applications are an objective that runs completely opposite to the regulations mandated objectives for passenger car vehicles. Therefore, fuel delivery systems for racing applications are not subject to the mandated regulations for passenger car vehicles. As a result, carburetors for racing applications have been developed that do not use a butterfly throttle assembly to control the air intake. If one considers the operation of a prior art throttle plate assembly within the carburetor, it is readily understood why such configuration is unacceptable for applications where maximum horsepower is the only criteria.

For example, a prior art carburetor has a body having a throughbore defining a venturi. Air flows through the throughbore before entering the engine. A fuel line extends between a fuel reservoir and the venturi to deliver fuel from the fuel reservoir and mix the fuel with the air to form a combustible mixture. The throttle plate located in the throughbore, downstream of the venturi, opens and closes the throughbore to regulate the flow of the fuel/air mixture in response to the demand of the engine. As the throttle plate opens, airflow through the venturi increases. More fuel is mixed with the increasing airflow to maintain a combustible air/fuel mixture as the engine speed increases. Conversely, when the throttle plate closes, the airflow decreases and the amount of fuel mixed with the air decreases as engine speed decreases.

The venturi includes a reduced diameter throat. The speed of the air flow increases through the reduced diameter throat and its air pressure decreases by a physical effect known as the venturi effect. The reduced air pressure generates a partial vacuum or suction in the venturi throat. The fuel supply line opens in the venturi throat so that the suction draws fuel from the fuel reservoir through the fuel line and into the venturi to form the air/fuel mixture.

The amount of fuel mixed with the airflow is metered to form the optimum air/fuel mixture required for combustion. This ratio is referred to as the stoichiometric ratio. If too much fuel is added to the air flow, the air/fuel mixture is too rich. If not enough fuel is added, the air/fuel mixture is too lean. In either case the engine performance will suffer and engine power is reduced. In racing application, the optimum air/fuel mixture delivered by the carburetor should be maintained over the entire range of engine operation for best engine performance.

The problem with the above-described carburetor is that the throttle plate is located in the mainstream of the flow or air passing through the body of the carburetor. At full throttle operation, typical of most racing engine applications for 85%-95% of their lifespan, the airflow through the carburetor is so great that the airflow creates a drag on the throttle plate because it obstructs the flow of air through the carburetor. This friction acting on the throttle plate acts to reduce the momentum of the airflow resulting in turbulence destroying symmetries such that the overall result on the throttle plate interferes with acceleration, and maximum performance will suffer and engine power will be reduced. Further, presence of the throttle plate within the throat of the carburetor restricts the flow of air through the venturi than if there was no throttle plate to deal with. It is this problem that led to the development of the rotary valve carburetor.

Although rotary valve carburetors solve most of the problems created by the use of a throttle plate, the rotary valve carburetor has its own shortcomings. For passenger vehicle applications and the associated fuel economy and clean air restrictions, the rotary carburetor was an unfeasible choice because of the fuel management problems across the full range of vehicle operations. Significantly tighter tolerance requirements in manufacturing, to prevent leakage of fuel and proper fuel/air ratios over the entire range of engine operations, i.e., from idle to high speed applications, became cost prohibitive when compared to fuel injection fuel delivery systems. Therefore, butterfly valve or slide valve carburetor applications were limited to smaller engine applications such as snowmobiles, personal watercrafts, all-terrain vehicles and motorcycles as well as lawn mowers, chainsaws, and the like. However, increasingly strict gas emission regulations have made the applications to the latter more demanding and costly. However, for high performance racing application, these regulations and cost can be mitigated.

A further attempt to avoid the shortcomings of a butterfly valve carburetor resulted in the development of an aftermarket modification known as the flat slide throttle valve carburetor such as disclosed in U.S. Pat. No. 4,008,298 owned by the inventor of the present patent application.

The flatslide carburetor has a higher flow rate than a butterfly valve carburetor through the carburetor throat for a given pressure due to the lower frictional losses caused by the flat throttle plate. The lower losses are due to the relatively smaller surface area of the flat plate parallel to the direction of the airflow. Whereas the round side has an idealized frictional surface area equal to the area of the circular cross section of the barrel, the idealized frictional surface area of the flat slide carburetor is equal to the area of the flat plate edge times its width, which is typically a substantially lower value.

Further, the flat slide throttle plate occupies less volume in the carburetor throat and requires relatively less machining. In areas of the throat that contribute to flow restrictions and random localized turbulence. In practice, the flat slide carburetor increases the flowrate by approximately 15% at intermediate throttle settings and a percent or so at full throttle. These improvements in performance come at a relatively high price due to the higher manufacturing costs of the flat slide configuration.

All of the aforementioned devices suffer from frictional drag and discontinuities in the carburetor throat, caused either by the shape of the slide itself or by the machining within the carburetor throat required to accommodate the slide or butterfly throttle plate.

In light of the above, there is a continuing need for an improved rotary throttle valve type carburetor which will enable an internal combustion engine to secure the necessary amount of fuel during low-speed operation, such as during idling of the engine, and have an improved fuel delivery characteristic during acceleration and high-speed operation of the engine.

BRIEF SUMMARY OF THE INVENTION

The present invention is directed to an improved rotary carburetor for internal combustion engines and particularly, racing engines. The improved compact carburetor has a rotary throttle valve body supported by sealed bearings mounted on bearing shafts integral with end caps press fit into the respective ends of a cylindrical tubular body of the rotary throttle valve. One face of the end cap is machined with a radial taper to provide a venturi effect within the throat of the rotary barrel in order to provide an accelerated air flow to better atomize the fuel and obtain a more symmetrical airflow across the full open throat of the barrel housing. The rotor body assembly is mounted within a barrel housing having a barrel or cylindrical cavity enclosed therein and a main bore extending along the barrel axis with the main bore and barrel cavity enclosing the incoming air stream. The end caps mounted in the rotary throttle valve body define a venturi having an inlet, an outlet spaced axially from the inlet, and a reduced diameter throat between the inlet and outlet.

Rotational movement of the rotor body varies the throughbore opening area of the arc-segment throttle passage exposed to the carburetor intake passage for controlling the airflow therethrough.

Since the airflow through the carburetor is a direct response to the vacuum created inside the manifold of the engine, maximum air velocity is obtained at the point within the inlet where the venturi created by the rotor end caps has the smallest internal diameter. It is at this location, axially along the barrel length, that the fuel metering rod is located. The fuel metering rod is the only element of the rotary carburetor that is located within the air stream through the main bore of the carburetor. The fuel metering rod communicates with a fuel bowl and float assembly attached to the underside of the barrel housing. The metering rod, which vaporizes the fuel with the passing air, is directly exposed to the manifold pressure of the engine. The fuel metering rod is located in the narrowest portion of the venturi throat. The shape of the metering rod compliments and enhances the fuel vaporization process by carrying the fuel all the way up the length of the metering rod. In this manner, fuel vapors are spread over the entire distance of the carburetor venturi bore. This creates a more efficient burnable mix along the complete width of the air entering the intake manifold. The air/fuel mixture flow about the fuel metering rod is completely symmetrical within the barrel of the carburetor housing resulting in fewer disturbances in the airflow entering the intake manifold.

Any adjustments to the fuel metering rod can be accomplished from the outside of the rotary valve carburetor so there is no need to disassemble anything on the rotary valve carburetor to make adjustments to the fuel metering rod. A single set screw at the top of the carburetor housing provides easy access to allow adjustments to the metering rod. Accordingly, it is an object of the present invention to provide an improved rotary valve carburetor wherein the rotor throttle valve body is mounted on bearings located by bearing shafts integrally machined on the end caps press fit into respective ends of the rotary throttle valve body of the carburetor such that the frictional drag associated with drag producing surfaces and discontinuities in the air intake passage caused by a throttle body or machining within the throat to accommodate fuel ports are completely eliminated.

It is a primary object of the invention to provide a rotary throttle valve carburetor wherein the usual venturi structure forming a part of the air intake passage leading to the intake manifold is made a part of the rotary throttle valve body yet remains co-linear with the air intake passage while the rotary throttle valve body rotates friction-free so as to provide even, uninterrupted fuel flow to the restricted venturi structure from idle to full throttle position.

It is a further primary object of the present invention to provide an improved rotary throttle valve carburetor having a rotary throttle valve mounted on bearings within the carburetor body housing, so as to reduce the frictional drag on the airflow through the air intake passage.

It is a further object of the present invention to provide a rotary throttle valve carburetor wherein the venturi effect caused by the divergence of the air intake passage can be varied by replacement of the rotary throttle body valve assembly.

It is still a further object of the present invention to provide a rotary throttle valve carburetor that is more compact than a conventional butterfly or slide valve configuration yet will precisely control air flow to provide increased horsepower over an equivalent butterfly valve throttle of equal port size across the entire operational range of the internal combustion engines operating parameters, while allowing for stable idle conditions.

It is yet a further object of the invention to provide an improved rotary throttle valve carburetor having interchangeable venturis such that preselected driving conditions can be quickly accommodated.

It is yet a further object of the invention to provide an improved rotary throttle valve carburetor which can be used as a direct fuel injector by removing the fuel bowl and fuel pickup tube and attaching a fuel feeding line directly to the fuel metering rod assembly or attaching it to a fuel mixing chamber via a fuel injector.

It is still a further object of the invention to provide an improved compact rotary throttle valve carburetor which has simplified means for adjusting the fuel metering rod settings wherein the metering rod sufficiently restricts the amount of fuel delivered to an engine under all operating parameters and which is of relatively simple design, economical to manufacture and assemble, and which has a long, useful life in service.

Other objects and features of the invention may become apparent from the description which follows, especially when taken in conjunction with the accompanying drawings illustrating the invention.

BRIEF DESCRIPTION OF THE SEVERAL VIEWS OF THE DRAWINGS

FIG. 4 is a side view of the rotary carburetor body housing illustrating the cylindrical valve chamber;

FIG. 5 is a plan view of the cylindrical tubular body illustrating the venturi passage created by the bearing end caps;

FIG. 6 is a plan view of the detailed structure of a bearing end cap;

FIG. 7A illustrates the relationship of the fuel system elements and the idle position of the air intake passage as created by the arc-segment passage of the rotary valve throttle body.

DETAILED DESCRIPTION OF THE PREFERRED EMBODIMENT

Figure 1:
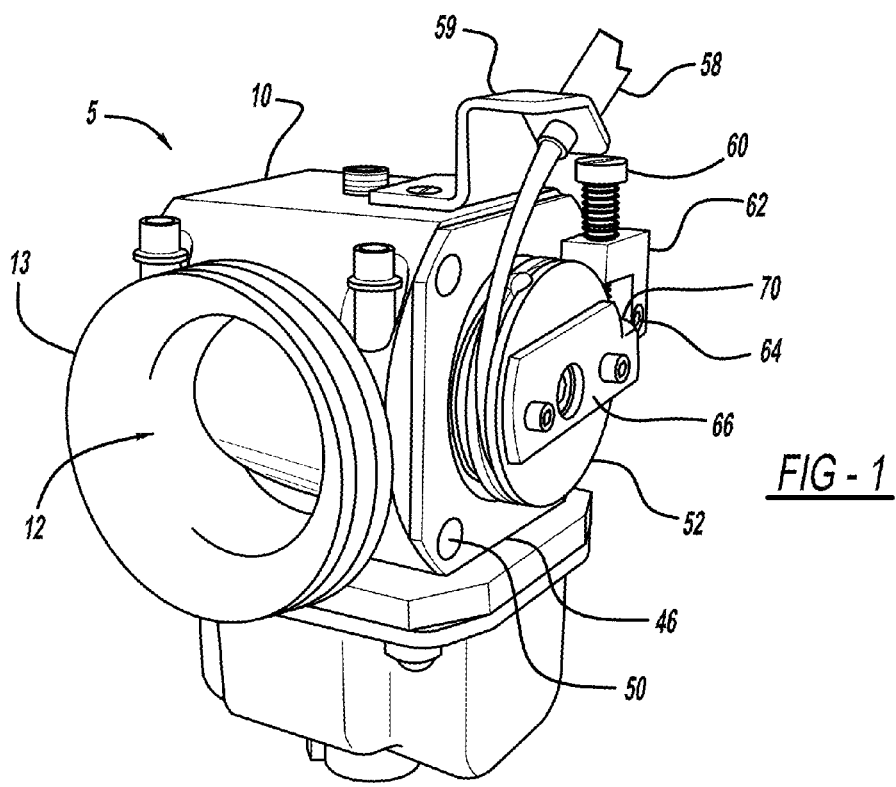
FIG. 1 is a perspective view of the preferred embodiment of the rotary throttle valve carburetor.
Figure 2:
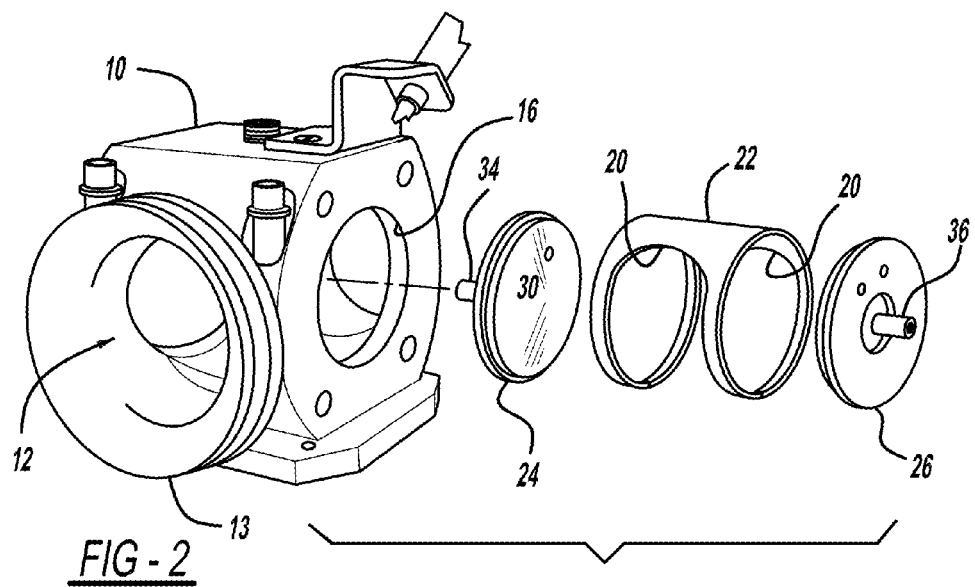
FIG. 2 is a perspective view of a stripped down carburetor body housing with the cylindrical tubular body and bearing end caps aligned with the cylindrical valve chamber to illustrate the assembly of the cylindrical tubular body and end caps into the cylindrical valve chamber.
Figure 3:
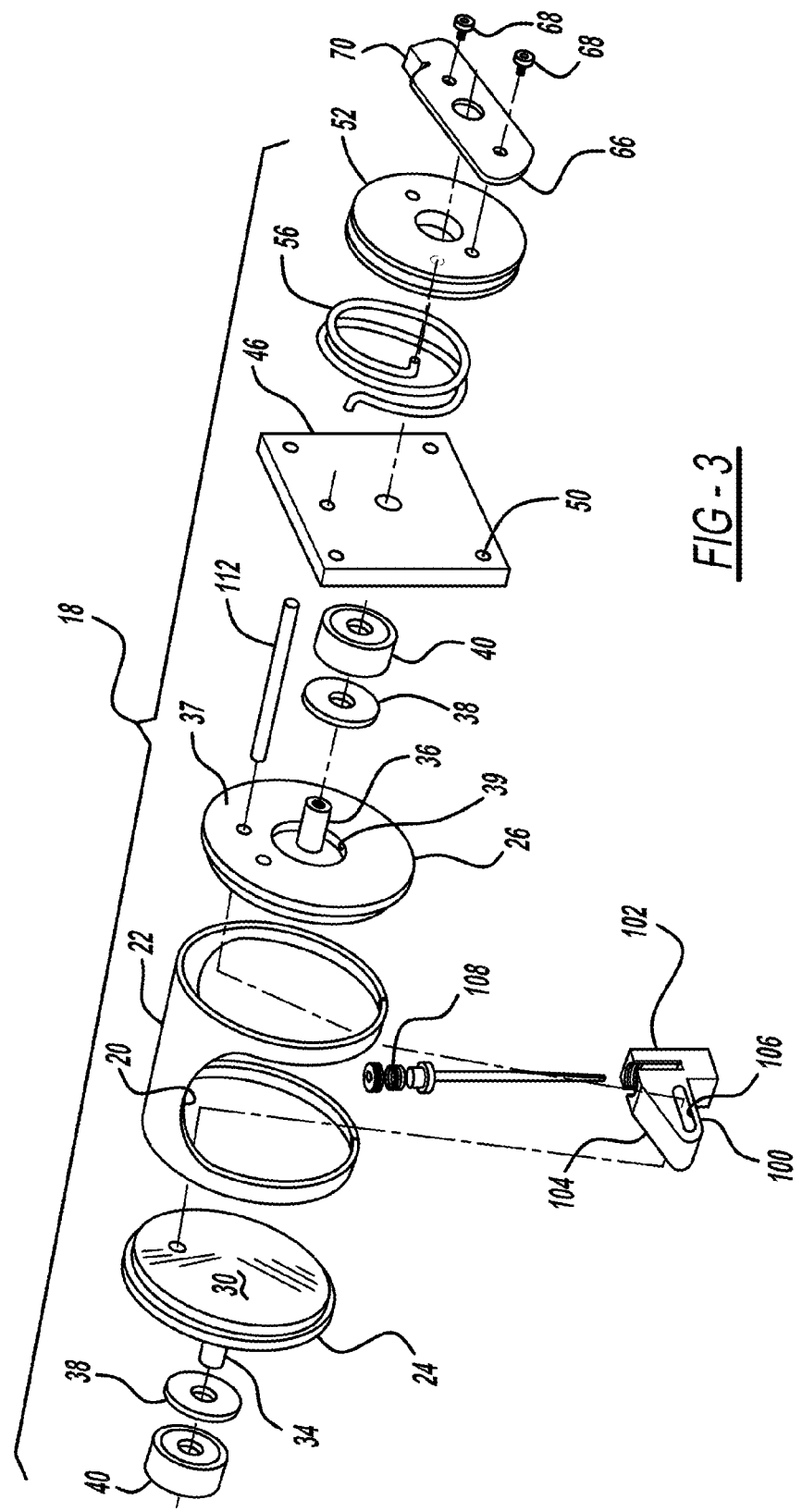
FIG. 3 is a perspective view of each element of the rotary carburetor that makes up the rotary throttle valve body assembly excluding the end bearing plate and guide cam and associated fuel metering rod.

As shown in FIGS. 1-4, the rotary throttle valve carburetor 5 embodying the present invention includes a carburetor body housing 10 having an air intake passage 12 of barrel or cylindrical shape which passes transversely through the carburetor body housing 10. One end 13 has a bell-shaped air inlet; the other end 14 of the centrally disposed air intake passage 12 communicates with an air intake port of an engine (not shown). The carburetor body housing 10 is provided with a cylindrical valve chamber 16 that is transverse to the centrally disposed air intake passage 12. A rotary throttle valve body assembly 18 is rotatably mounted in the cylindrical valve chamber 16. As shown in FIGS. 2 and 3, a rotary throttle valve body assembly 18 has an arc-segment passage 20 selectively and progressively aligned with the air intake passage 12 as the rotary throttle valve body assembly 18 is controllably rotated and rotatable between idle and wide open throttle positions to thereby regulate the flow of air and fuel through the rotary carburetor as is set forth below.

The rotary throttle valve body assembly 18 is preferably a cylindrical tubular throttle body 22 having the arc-segment passage 20 selectively and progressively aligned so as to cutaway a predetermined selective peripheral portion of the cylindrical tubular throttle body's 22 circumferential surface area. It is significant to note that although the arc-segment passage 20 in the preferred embodiment shown appears as an arc-segment throughbore, it is possible to select any geometric form for this arc-segment passage providing the arc-segment passage is selectively and progressively aligned with the air intake passage 12 as the rotary throttle valve body is controllably rotated and rotatable between idle and wide open throttle positions to thereby regulate the flow of air and fuel through the rotary carburetor.

The cylindrical tubular throttle body 22 further has left and right end caps 24, 26 press-fit into the respective ends of the cylindrical tubular throttle body 22. The end caps 24, 26, as illustrated in FIGS. 2, 3, 5, and 6, have at one end thereof 28 a tapered end face 30 which upon assembly to the cylindrical tubular throttle body 22 of the rotary throttle valve body assembly 18 with the carburetor body housing 10, as shown in FIGS. 2 and 5, form a venturi 32 in the air intake passage 12 of the carburetor body housing 10. The end caps 24, 26 are assembled to the cylindrical tubular throttle body 22 by press fitting each end cap 24, 26 into a respective end of the cylindrical tubular body 22. The other end of the end caps 24, 26 have a bearing shaft 34, 36 extending from the end face 37 along the central axis of each cap 24, 26 to accommodate a bearing washer 38 and a ball bearing 40 mounted on the bearing shaft 34, 36 and within a counterbore 39 in the end face 37 of the other end of each cap 24, 26. With this arrangement, it is relatively easy to see if a user desires a different venturi effect then what is provided with the standard carburetor, the complete rotary throttle valve body assembly 18 is quickly removable from the cylindrical valve chamber 16 of the carburetor housing 10 and a pre-assembled rotary throttle valve body assembly with end caps 24, 26 having different tapers can easily take the place of the removed rotary valve body assembly 18 and reassembled to provide any desired venturi effect in the carburetor air inlet passage 12.

The rotary throttle valve body assembly 18 is maintained within the cylindrical valve chamber by a pair of end bearing plates 44, 46, attached to the carburetor body housing 10. One plate each mounted along each side of the end caps 24, 26 of the rotary throttle valve body assembly 18 thereby capturing the ball bearing 40 and bearing washer 38 into a counterbored pocket 39 in the end face 37 of the end caps 24, 26 and against each of the end bearing plates 44, 46. Four screws 50 attach each of the end bearing plates 44, 46 to the carburetor body housing 10. With the rotary throttle valve assembly 18 mounted in bearings 40 between the end bearing plates 44, 46 attached to the carburetor body housing 10 the rotary valve throttle body is able to rotate completely friction free and, as a result, there is little frictional drag on the rotary throttle valve movement between idle and full throttle position.

To operate the rotary throttle valve body from idle to full throttle position, a cylindrical cam 52 shown in FIGS. 1 and 3 is mounted on the bearing shaft 36 with a set screw (not shown) locking the cylindrical cam 52 to the bearing shaft 36. A torsion spring 56 is mounted between the end bearing plate 46 and the cylindrical cam 52. One end of the torsion spring 56 is fixed to the end bearing plate 46 while its opposite end is fixed to the cylindrical cam 52. An accelerator cable 58 is attached to a cable bracket 59 mounted to the carburetor body housing 10. The accelerator cable 58 is attached to the cylindrical cam 52 to rotate the cylindrical cam 52 from idle to full throttle position. An idle adjustment screw 60 is threadably attached to a bracket 62 which in turn is mounted to the carburetor body housing 10 with a threaded allen-head screw 64. An idle adjustment plate 66 is mounted to the outer face of the cylindrical cam 52 with two allen-head screws 68. The idle adjustment plate has a bowed end portion 70 transversely at a 90° angle such that as the cylindrical cam 52 is rotated from a wide open throttle position to an idle position by the resiliency of torsion spring 56, the bowed end portion 70 abuts the idle adjustment screw 60. Accordingly, the idle adjustment can easily be accomplished with a screwdriver without having to disassemble any portion of the carburetor elements.

Figure 7A:
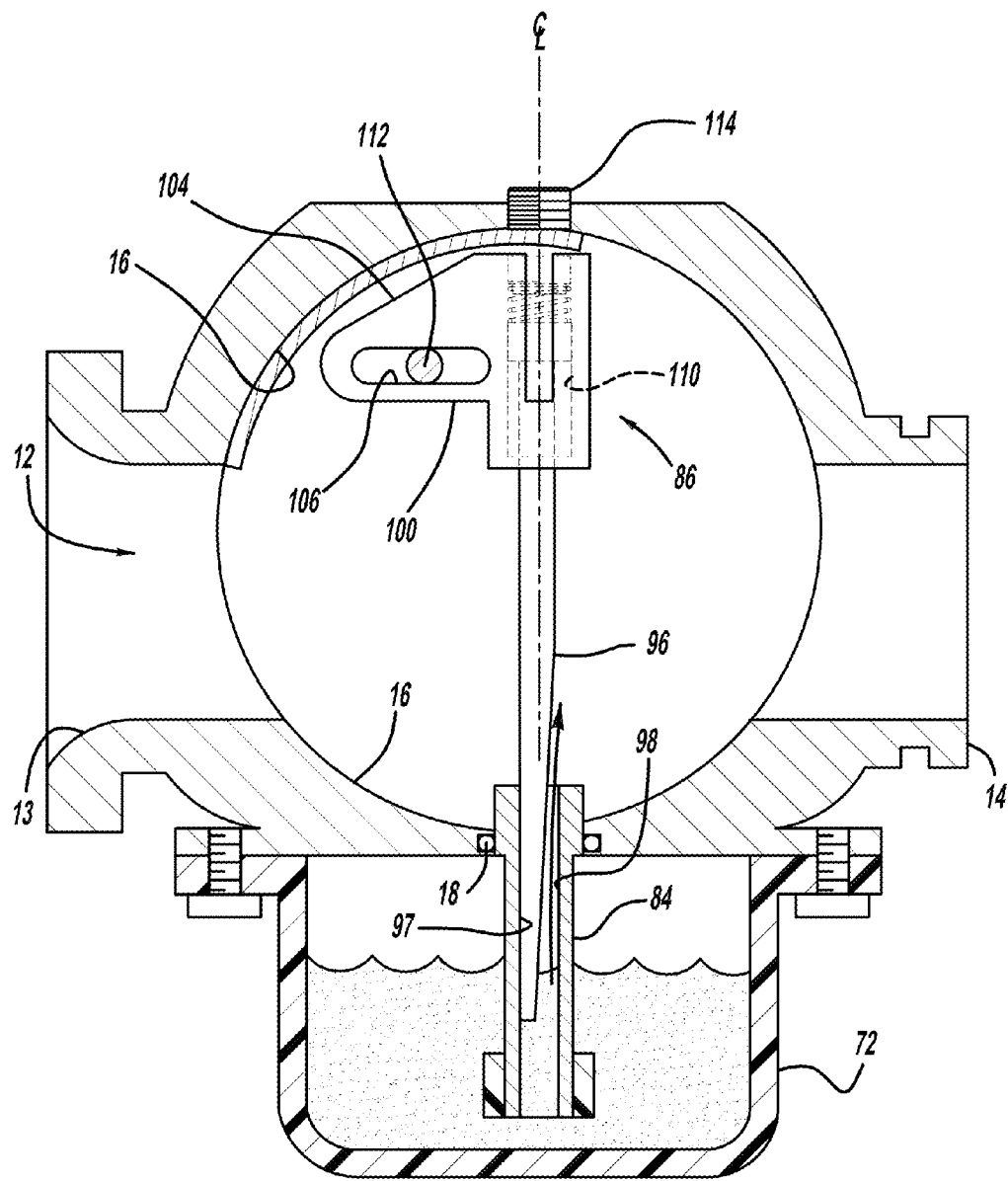
FIG. 7A is a part cross-sectional view of the rotary carburetor body housing illustrating the relationship between the movement of the fuel metering pickup tube and fuel metering rod assembly and the full opening of the air intake passage created by the arc-segment passage of the rotary valve throttle body.
Figure 7B:
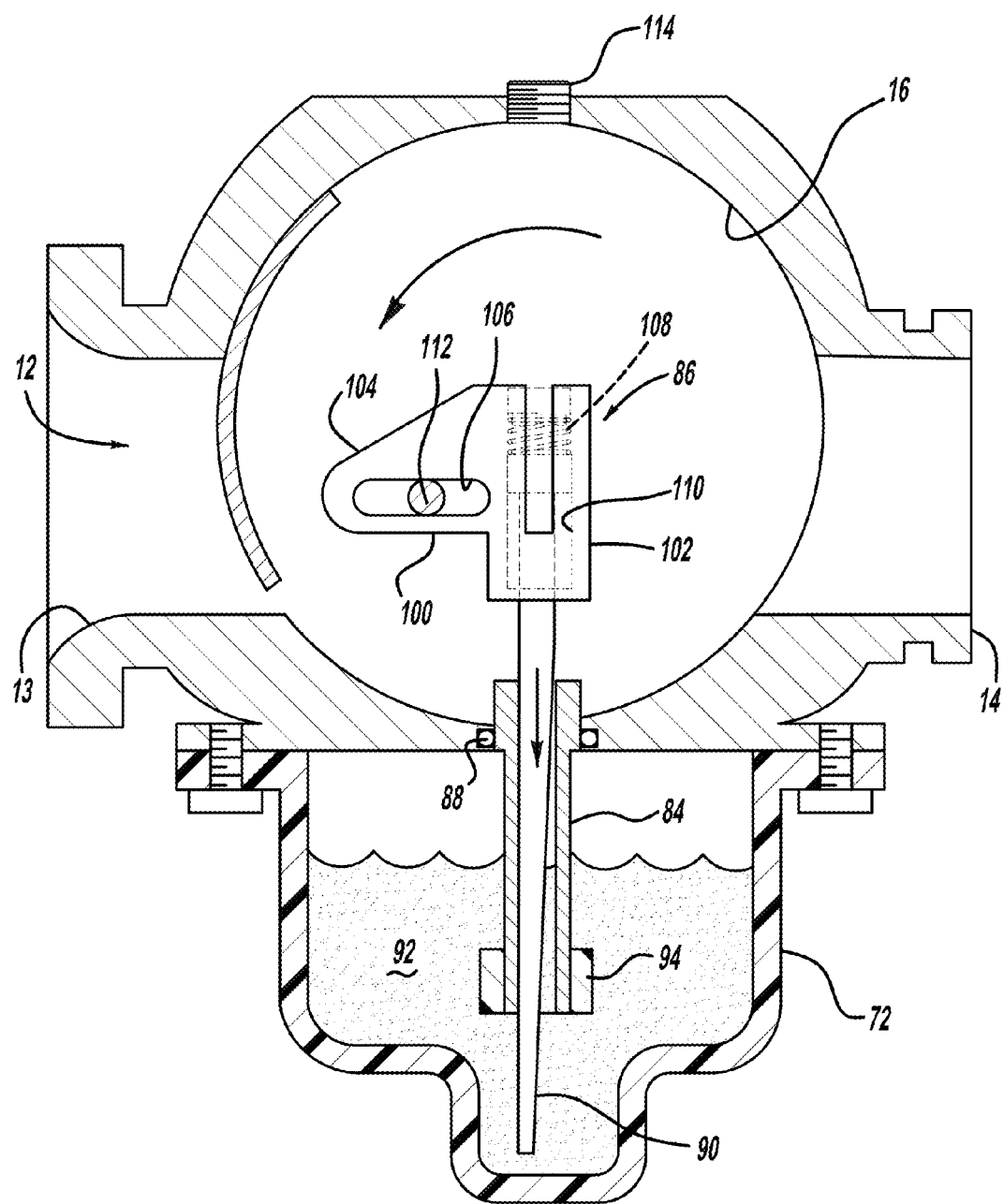
FIG. 7B unlike

Fuel is provided to the air intake passage 12 through a fuel metering rod mounted in the cylindrical valve chamber 16 and communicating with a fuel bowl 72 attached to the bottom of the carburetor body housing 10 as shown in FIGS. 7A and 7B. A fuel bowl 72 is provided with a fuel inlet leading to a float needle valve. The float needle valve is controlled by a pair of floats guided by pins within the fuel bowl. This standard prior art arrangement is such that the floats, when lifted by the rising level of fuel in the fuel bowl will close float needle valve, thus regulate the level of fuel in the fuel bowl (not shown). The fuel is delivered to the air intake passage by the use of a fuel pickup tube 84 and a fuel metering rod assembly 86. The fuel pickup tube 84 is mounted in the bottom of the cylindrical valve chamber 16 of the carburetor body housing 10. The one end 88 of the fuel pickup tube 84 is threaded into a threaded bore in the wall of the carburetor body housing 10. Note that any portion of the fuel pickup tube 84 extending into the cylindrical valve chamber does not interfere with the airflow through the air intake passage 12. The opposite end 90 of the fuel pickup tube 84 extends into the fuel bowl 72 well below the level of the fuel 92 stored in the fuel bowl 72. A fuel filter 94 is attached to the opposite end 90 of the fuel pickup tube 84, so that any fuel entering the fuel pickup tube 84 is assured to not have any contaminants therein.

The fuel metering rod 87 delivers the fuel from the fuel bowl 72 to the air intake passage 12 in order to mix the fuel with the airflow and deliver the mixture to the intake manifold (not shown). A fuel pickup signal is generated at the fuel metering rod 87 as a result of the manifold pressure (vacuum) and the airflow through the rotary carburetor responding to the vacuum created inside the intake manifold of the engine. Maximum air velocity through the carburetor is obtained at the throat of the venturi 32 created by the tapered end face 30 mounted in the cylindrical tubular body 22 of the rotary throttle valve body assembly 18 as shown in FIG. 5. Therefore, the fuel metering rod 87 which is mounted in the fuel pickup tube 84 is mounted along the central axis of the air intake passage 12 and in the center of the venturi passage 32, equally spaced from the end caps 24, 26 tapered end faces 30 mounted to the rotary throttle valve body 19. The fuel metering rod 87 shown in FIGS. 7A and 7B has a tapered flat ground 96 along a substantial length thereof. The angle of the taper determines how much fuel is delivered to the air intake passage 12 as is explained hereinafter. Since the fuel metering rod 87 and its associated ground flat 96 is slidably mounted in a bore 97 of the fuel pickup tube 84, the tapered ground flat 96 allows fuel to be drawn into the air intake passage 12 by the fuel pickup signal created by the fuel metering rod 87 and the high velocity of the airflow in the air intake passage 12. The flat ground side 96 of the fuel metering rod 87 spanning the high velocity airflow enhances the fuel pickup signal. The fuel metering rod 87 accomplishes this by creating divergence of flow around the cylindrical fuel metering rod 87. This divergence is similar to the low-pressure area created by an aircraft wing, which utilized low pressure to create lift. The carburetor uses divergence to create "fuel-lift" from the fuel bowl 72 through the fuel pickup tube 84 and along the tapered ground flat 96 of the fuel metering rod 87 and into the airflow surrounding the fuel metering rod 87. The shape and contour of the ground surface 96 of the fuel metering rod 87 controls how much fuel is allowed to be lifted from the fuel bowl 72 in response to the extremely strong fuel pickup signal. The depth of the grind and therefore the size of the opening 98 between the bore of the pickup tube 97 and the ground flat 96 on the fuel metering rod 87 determined the amount of fuel delivered to the air intake passage 12. The fuel metering rod 87 profile is smooth and continuous and therefore eliminates "flat spots" often found on conventional carburetors with multiple overlapping fuel circuits. The fuel metering rod 87 provides for a smooth consistent throttle response from idle to wide open position since the rotation of the rotary throttle valve is on bearings so as to eliminate any type of frictional drag in rotating the throttle valve within the air stream of the air intake passage 12.

The fuel pickup signal at the base of the fuel metering rod 87 is significantly stronger than what is found on conventional carburetors. This extremely high pickup signal relates to instantaneous acceleration created by the fuel surge when the rotary throttle valve body 18 is snapped open.

The shape of the fuel metering rod 87 compensates and enhances the fuel atomization process by carrying the fuel signal and fuel vapor all the way up the length of the fuel metering rod 87. In this manner, fuel vapors are spread over the entire distance of the carburetor air inlet passage. The contoured side of the fuel metering rod 87 creates a fuel vacuum "wick" whereby the fuel vapors diverge from the fuel metering rod 87 starting at the base, where it protrudes from the fuel pickup tube 84, and continues to the top of the fuel metering rod 87. This allows a more efficient burnable mixture to be created with all the fuel/air mixture entering the intake manifold.

The contoured side of the fuel metering rod 87 faces the incoming airflow and thereby creates an extremely low pressure area at the interface of the air flow and outer surface of the fuel metering rod 87. This low pressure area results in the fuel being converted into a very fine vapor. Those extremely fine vapors are subsequently easily dispensed downstream in the bore of the carburetor. The finer the vapor the more efficient the burnable mix. A more efficient burnable mix results in more horse power and better fuel economy.

The movement of the fuel metering rod 87 is accomplished by the use of a guide cam 100 which establishes the timing relationship between the rotation of the rotary throttle body valve assembly 18 from idle to full open throttle position and the amount of fuel that is metered from the fuel bowl 72, through the fuel pickup tube 84 and dispersed into the air stream by the fuel metering rod 87.

The guide cam 100 has a threaded bore 110 in a flange portion 102 at one end of the guide cam 100. Opposite the flange portion 102 is a cantilevered frame 104 that contains a horizontal slot 106. The fuel metering rod 87 has a threaded end 108 opposite the ground flat 96 that mounts into the threaded bore 110 of the flange portion 102 of the guide cam 100. A cam guide pin 112 spans the distance between the two end caps 24, 26 and is removably mounted therein to rotate with the end caps 24, 26 as is illustrated in FIG. 3. The cam guide pin 112 extends through the horizontal slot 106 to connect the metering rod assembly 86, 100, 104 to the rotary throttle valve body assembly 18 such that as the rotary throttle valve body 19 is rotated from an idle position to a full throttle position, the cam guide pin 110 will lift the fuel metering rod 87 and its assembly 86 out of the fuel pickup tube 84 to permit the vacuum in the manifold to create a fuel pickup signal at the fuel metering rod 87 to lift and flow the fuel from the fuel bowl 72 into the air intake passage, and create a vaporized air/fuel mixture that flows into the intake manifold.

Any adjustment of the fuel metering rod is easily made by simply removing a set screw 114 located in the top portion of the carburetor body housing 10 opposite the location of the fuel pickup tube 84. When the set screw is removed the opening allows access to the top of the fuel metering rod that is threaded into the bore 110 of the flange portion 102 of the guide cam 100. Raising the fuel metering rod 87 by turning the threaded portion counter-clockwise permits more fuel to be drawn into the air intake passage 12 conversely turning the fuel metering rod 87 clockwise reduces the amount of fuel drawn into the air intake passage 12 from idle to full open throttle position.

From the foregoing, it will be seen that the invention is one well adapted to obtain all the objects herein set forth, together with other advantages which are obvious and which are inherent to the structure.

It will be understood that certain features and sub-combination are of utility and may be employed without reference to other features and sub-combinations. This is contemplated by and well within the scope of the claims. Although the preferred embodiment has been shown in the drawings, many other embodiments may be made of the invention without departing from the scope thereof. For example, the circumferential passage in the rotary throttle valve body may be of variable configurations dependent on the response intended to be obtained from the engine. A contoured form may be adapted to provide a very selective acceleration response from idle to full throttle position of the rotary throttle body. Also, by removing the fuel bowl 72 from the carburetor body housing 10 and adapting a fuel line to be mounted directly to the fuel pick up tube, the carburetor may be used as a direct fuel injector. It is to be understood that all matter herein set forth shown in the accompanying drawings is to be interpreted as illustrated and not in a limiting sense.

What is claimed is:

1. A rotary throttle valve carburetor comprising:
    a carburetor body housing having
        an air intake passage, said air intake passage extending through said carburetor body housing from one end through an opposite end;
        a cylindrical valve chamber located in said carburetor body housing transverse to said air intake passage;
        a rotary throttle valve body mounted in said cylindrical valve chamber, said rotary throttle valve body having a generally cylindrical tubular body including a central axis and further comprising:
            an arc-segment passage in the circumferential surface of said rotary throttle valve, said arc-segment passage selectively and progressively aligned with said air intake passage as the rotary throttle valve body is rotated and rotatable between idle and full open throttle positions to thereby regulate the flow of air and fuel through the carburetor; and
            means for converging the airflow through said air intake passage so as to create a venturi effect as air flows through said air intake passage;
    a first end cap press fit into one end of said cylindrical tubular body of said rotary throttle valve body, said first end cap having a radially tapered end face extending into said air intake passage;
    a second end cap press fit into an opposite end of said cylindrical tubular body of said rotary throttle valve body, said second end cap having a radially tapered end face extending into said air intake passage complimentary said radially tapered end face of said first bearing end cap to define a venturi in said air intake passage whereby air entering said air intake passage will be accelerated by the venturi effect of said converging means;
    means for supplying fuel to said carburetor body housing; and
    means for delivering fuel from said fuel supply means to said air intake passage;
    whereby fuel delivered from said fuel supply means is fully atomized by the air flowing through said air intake passage and accelerated by the venturi effect of said converging means and thereafter exits said air intake passage.

2. The rotary throttle valve carburetor as claimed in claim 1 further comprising:
    bearing means mounted between said rotary throttle valve body and said carburetor body housing whereby frictional rotation due to rotatable movement of said rotary throttle valve body rotating between idle and full open throttle positions is minimized.

3. A rotary throttle valve carburetor, comprising:
    a carburetor body housing having
        an air intake passage, said air intake passage extending through said carburetor body housing from one end through an opposite end;
        a cylindrical valve chamber located in said carburetor body housing transverse to said air intake passage;
        a rotary throttle valve body mounted in said cylindrical valve chamber, said rotary throttle valve body having a generally cylindrical tubular body including a central axis and further comprising:
            an arc-segment passage in the circumferential surface of said rotary throttle valve, said arc-segment passage selectively and progressively aligned with said air intake passage as the rotary throttle valve body is rotated and rotatable between idle and full open throttle positions to thereby regulate the flow of air and fuel through the carburetor; and
    means for converging the airflow through said air intake passage so as to create a venturi effect as air flows through said air intake passage;
    a first end cap press fit into one end of said cylindrical tubular body of said rotary throttle valve body, said first end cap having a radially tapered end face extending into said air intake passage;
    a second end cap press fit into an opposite end of said cylindrical tubular body of said rotary throttle valve body, said second end cap having a radially tapered end face extending into said air intake passage complimentary said radially tapered end face of said first bearing end cap to define a venturi in said air intake passage whereby air entering said air intake passage will be accelerated by the venturi effect of said converging means.

4. The rotary throttle valve carburetor as claimed in claim 3 wherein said first and second end caps each further comprise:
    a transverse end face at an opposite end of each said first and second end caps, said transverse end face having a centrally disposed counterbore therein and a bearing shaft projecting from said counterbore.

5. The rotary throttle valve carburetor as claimed in claim 4 further comprising bearing means mounted to said bearing shaft of each said opposite end of said first and second end caps, said bearing means further comprising:
    a bearing washer mounted to each bearing shaft in said opposite end of said first and second end caps;
    a bearing member juxtaposed said bearing washer on each bearing shaft of said opposite end of said first and second end caps; and means for containing said rotary throttle valve body in said cylindrical valve chamber, said containing means attached to said carburetor body housing.

6. The rotary throttle valve carburetor as claimed in claim 1 wherein said means for supplying fuel to said carburetor further comprises:
   a source of fuel;
   a fuel bowl attached to the underside of said carburetor body housing;
   a fuel level float mounted in said fuel bowl;
   means for maintaining said fuel at a predetermined level within said fuel bowl.

7. The rotary valve carburetor as claimed in claim 1 wherein said means for delivering fuel further comprises:
   a fuel pickup tube mounted to said carburetor body housing, said fuel pickup tube having one end extending into said cylindrical valve chamber and an opposite end extending in a direction away from said carburetor body housing, said fuel pickup tube having a central passage therethrough;
   a fuel metering rod having at one end thereof a longitudinally disposed tapered ground flat surface and an opposite end with an enlarged threaded outer diameter, said one end of said fuel metering rod mounted in said central passage of said fuel pickup tube;
   a guide cam member having a threaded bore therethrough for receiving said enlarged threaded outer diameter of said fuel metering rod, said guide cam member further having a cantilevered portion defining a slotted passage; and
   means for raising said fuel metering rod as said rotary throttle valve body is rotated in said cylindrical valve chamber from idle position to full open throttle position whereby as said fuel metering rod is raised out of said fuel pickup tube passage such that said tapered ground flat on said metering rod creates an increasing cross-sectional opening between said tapered ground flat and said passage through said fuel pickup tube to increase the supply of fuel to said intake passage until said full open throttle position occurs, said means for raising said fuel metering rod further including means for lowering said fuel metering rod into said fuel pickup tube as said rotary throttle valve body is rotated in an opposite direction from full open throttle position to idle position.

8. The rotary throttle valve carburetor as claimed in claim 3 wherein said means for raising said fuel metering rod further comprises a guide cam pin positioned within said slotted passage of said guide cam member, said guide cam pin further having one end portion fixed to said first end cap of said rotary throttle valve body and an opposite end portion fixed to said second end cap of said rotary throttle valve body whereby as said rotary throttle valve body rotates from an idle position to a full open throttle position, said guide cam pin rotates with said rotary throttle valve body and concurrently slides in said slotted passage to raise said fuel metering rod out of said fuel pickup tube passage.

9. The rotary throttle valve carburetor as claimed in claim 5 wherein said means for supplying fuel to said carburetor further comprises:
   a source of fuel;
   a fuel bowl attached to the underside of said carburetor body housing;
   a fuel level float mounted in said fuel bowl;
   means for maintaining said fuel at a predetermined level within said fuel bowl.

10. The rotary valve carburetor as claimed in claim 9 wherein said means for delivering fuel further comprises:
    a fuel pickup tube mounted to said carburetor body housing, said fuel pickup tube having one end extending into said cylindrical valve chamber and an opposite end extending in a direction away from said carburetor body housing, said fuel pickup tube having a central passage therethrough;
    a fuel metering rod having at one end thereof a longitudinally disposed tapered ground flat surface and an opposite end with an enlarged threaded outer diameter, said one end of said fuel metering rod mounted in said central passage of said fuel pickup tube;
    a guide cam member having a threaded bore therethrough for receiving said enlarged threaded outer diameter of said fuel metering rod, said guide cam member further having a cantilevered portion defining a slotted passage; and
    means for raising said fuel metering rod as said rotary throttle valve body is rotated in said cylindrical valve chamber from idle position to full open throttle position whereby as said fuel metering rod is raised out of said fuel pickup tube passage such that said tapered ground flat on said metering rod creates an increasing cross-sectional opening between said tapered ground flat and said passage through said fuel pickup tube to increase the supply of fuel to said intake passage until said full open throttle position occurs, said means for raising said fuel metering rod further including means for lowering said fuel metering rod into said fuel pickup tube as said rotary throttle valve body is rotated in an opposite direction from full open throttle position to idle position.

11. The rotary throttle valve carburetor as claimed in claim 10 wherein said means for raising said fuel metering rod further comprises a guide cam pin positioned within said slotted passage of said guide cam member, said guide cam pin further having one end portion fixed to said first end cap of said rotary throttle valve body and an opposite end portion fixed to said second end cap of said rotary throttle valve body whereby as said rotary throttle valve body rotates from an idle position to a full open throttle position, said guide cam pin rotates with said rotary throttle valve body and concurrently slides in said slotted passage to raise said fuel metering rod out of said fuel pickup tube passage.

12. The rotary throttle valve carburetor as claimed in claim 5 wherein said means for containing said rotary throttle valve body in said cylindrical valve chamber further comprises:
    an end bearing plate mounted to each said bearing shafts and attached to said carburetor body housing whereby each said end bearing plate maintains said roller bearing in said centrally disposed counterbore in each said first and second bearing end caps so as to allow said carburetor throttle valve friction reduced rotation as said carburetor throttle valve rotates from idle to full throttle position.

13. The rotary throttle valve carburetor as claimed in claim 1 further comprising:
    means for rotating said rotary throttle valve body from an idle position to a full open throttle position.

14. The rotary throttle valve carburetor as claimed in claim 11 further comprising:
    means for rotating said rotary throttle valve body from an idle position to a full open throttle position.

15. The rotary throttle valve carburetor as claimed in claim 5 wherein said means for rotating said rotary throttle valve body is mounted on said bearing shaft of said transverse end of one of said first and second end caps, said means for rotating further being located adjacent said means for containing said rotary throttle valve in said cylindrical valve chamber.

16. The rotary throttle valve carburetor as claimed in claim 14 wherein said means for rotating said rotary throttle valve body is mounted on said bearing shaft of said transverse end of one of said first and second end caps, said means for rotating further being located adjacent said means for containing said rotary throttle valve in said cylindrical valve chamber.

17. A rotary throttle valve carburetor comprising:
a carburetor body housing having:
an air intake passage extending through said carburetor body housing from one end to an opposite end;
a cylindrical valve chamber located in said carburetor housing traversing said air intake passage;
an annular rotary throttle valve body having one end; an opposite end; and an arc-segment passage in the circumferential surface of said annular rotary throttle valve body, said arc-segment passage selectively and progressively aligned with said air intake passage as said annular rotary throttle valve body is rotated and rotatable between idle and full open throttle positions to thereby regulate the flow of air through said air intake passage;
first bearing means mounted to said one end of said annular rotary throttle valve body;
second bearing means mounted to said opposite end of said annular rotary throttle valve body;
each of said first and second bearing means further comprising means for converging the airflow through said air intake passage so as to collectively define a venturi along said air intake passage;
means for mounting said first and second bearing means respectively between said annular rotary throttle valve body and said carburetor body housing such that said annular rotary throttle valve body is rotatable between idle and full open throttle positions with limited frictional drag on said annular rotary throttle valve tubular body;
a fuel bowl attached to said carburetor body housing;
means for delivering fuel from said fuel bowl to said air intake passage, whereby fuel delivered from said fuel bowl to said air intake passage is fully atomized by the air flowing through said air intake passage and accelerated by the venturi effect of said converging means and thereafter exits said air intake passage.

* * * * *